United States Patent
Bemer

(10) Patent No.: US 9,643,528 B1
(45) Date of Patent: May 9, 2017

(54) PROPANE TANK SECURING CRADLE

(71) Applicant: Larry Bemer, Hudson, OH (US)

(72) Inventor: Larry Bemer, Hudson, OH (US)

( * ) Notice: Subject to any disclaimer, the term of this patent is extended or adjusted under 35 U.S.C. 154(b) by 126 days.

(21) Appl. No.: 14/792,702

(22) Filed: Jul. 7, 2015

(51) Int. Cl.
*B60P 7/08* (2006.01)

(52) U.S. Cl.
CPC .................... *B60P 7/0892* (2013.01)

(58) Field of Classification Search
CPC .................................... B60P 7/0892
USPC ...... 410/35, 36, 42, 46, 47, 49, 50, 89, 155; 211/85.22; 108/55.3, 55.1; 206/389, 206/446; 248/68.1; D23/206
See application file for complete search history.

(56) References Cited

U.S. PATENT DOCUMENTS

| | | | |
|---|---|---|---|
| 4,382,733 A * | 5/1983 | Rodgers | B65D 19/0095 410/49 |
| 4,932,621 A | 6/1990 | Kowk | |
| 6,386,559 B1 | 5/2002 | Souza | |
| 6,863,198 B1 | 3/2005 | Darby | |
| D523,518 S | 6/2006 | Moldenhauer | |
| 7,131,618 B2 | 11/2006 | Berry | |
| 7,644,819 B2 | 1/2010 | Gill | |
| 8,182,180 B2 | 5/2012 | Woodford | |
| 9,440,771 B2 * | 9/2016 | Pratt | B65D 19/20 410/49 |

* cited by examiner

*Primary Examiner* — Stephen Gordon
(74) *Attorney, Agent, or Firm* — Kyle A. Fletcher, Esq.

(57) ABSTRACT

The propane tank storage cradle is a storage device that is designed to hold a propane tank in a horizontal position. The cradle forms a chamber into which the propane tank is laid. Accommodations are also provided with the propane tank storage cradle to receive the tank valve guard and the tank base. The dimensions of propane tank storage cradle are designed to prevent the propane tank from rolling and the cradle from flipping. The bottom of the propane tank storage cradle is fitted with non-skid feet which prevent the propane tank storage cradle from shifting during transport. The propane tank storage cradle comprises a first end cap, a second end cap, a third internal support and a fourth internal support.

18 Claims, 4 Drawing Sheets

US 9,643,528 B1

PROPANE TANK SECURING CRADLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of storage devices, more specifically, an accessory configured for use in storing portable propane tanks.

The typical propane tank used by consumers in the cylinder exchange program is a standard 20 pound tank. The propane tank nominally contains 4.7 gallons of propane, weighs approximately 38 pounds when full, has an overall height of approximately 18 inches and has an outer cylinder diameter of approximately 12.5 inches. Propane tanks provide a safe and reliable way to provide propane gas for consumer use. However, the transport of propane tanks can be problematic because of the cylindrical nature of the tanks and the propensity of the tank to fall over when the transporting automobile makes a turn. While the propane tank can be somewhat secured using ropes or bungee cords, the mass of the tank can still cause the tank to shift. A method is needed to better secure propane tanks for transport by automobile.

SUMMARY OF INVENTION

The propane tank storage cradle is a storage device that is designed to hold a propane tank in a horizontal position. The cradle forms a chamber into which the propane tank is laid. Accommodations are also provided with the propane tank storage cradle to receive the tank valve guard and the tank base. The dimensions of propane tank storage cradle are designed to prevent the propane tank from rolling and the cradle from flipping. The bottom of the propane tank storage cradle is fitted with non-skid feet, which prevent the propane tank storage cradle from shifting during transport.

These together with additional objects, features and advantages of the propane tank storage cradle will be readily apparent to those of ordinary skill in the art upon reading the following detailed description of the presently preferred, but nonetheless illustrative, embodiments when taken in conjunction with the accompanying drawings.

In this respect, before explaining the current embodiments of the propane tank storage cradle in detail, it is to be understood that the propane tank storage cradle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the propane tank storage cradle.

It is therefore important that the claims be regarded as including such equivalent construction insofar as they do not depart from the spirit and scope of the propane tank storage cradle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
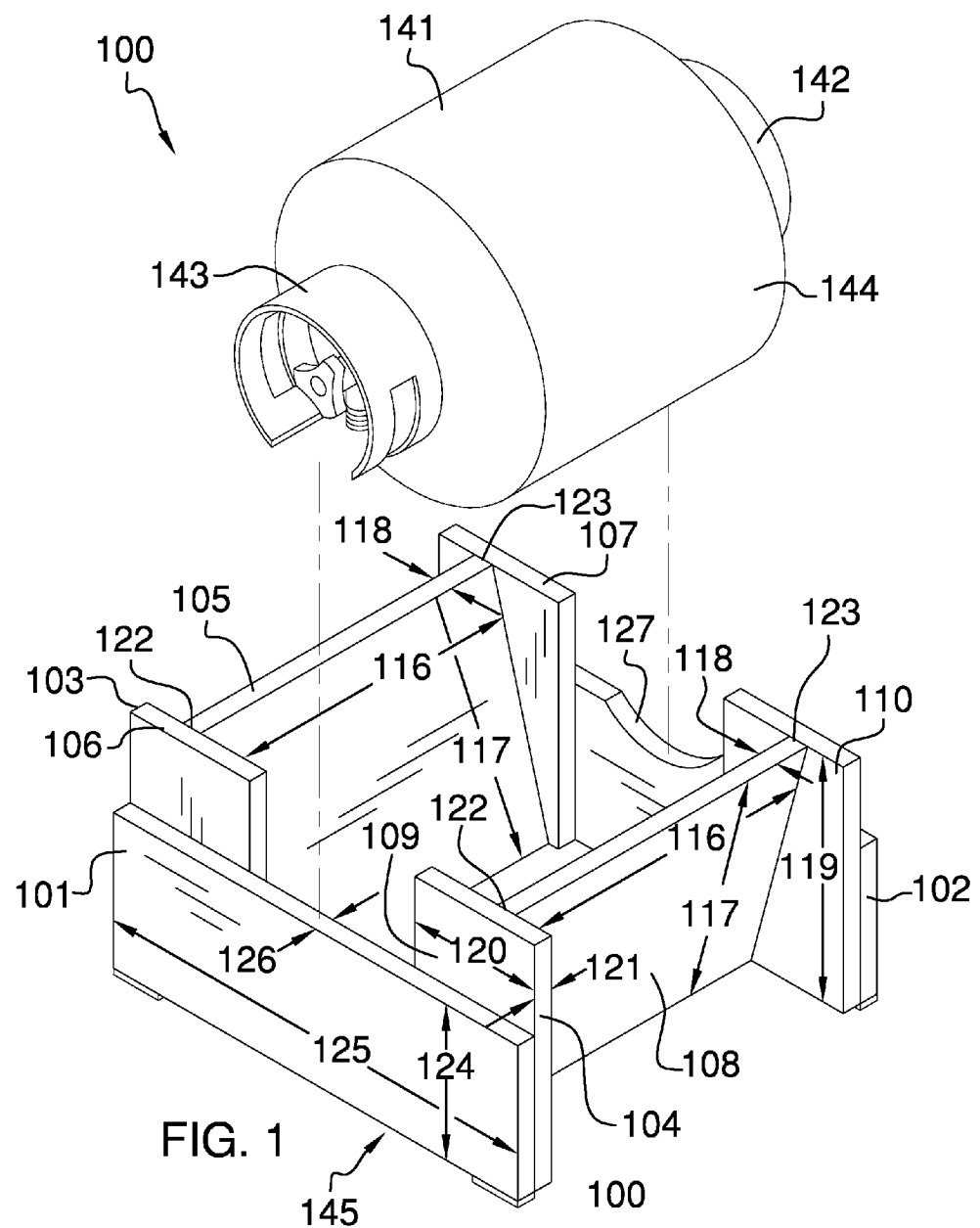
FIG. 1 is a perspective view of an embodiment of the disclosure.
Figure 2:
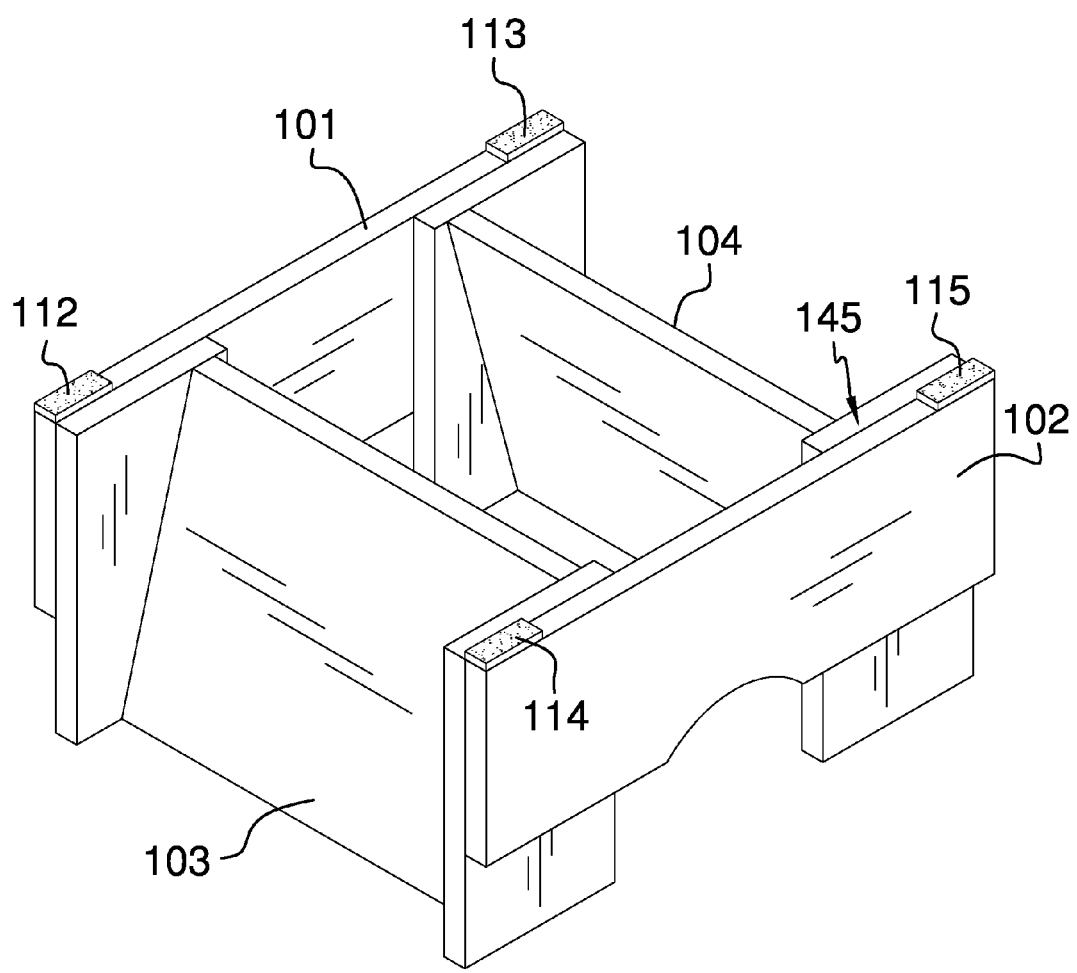
FIG. 2 is a bottom perspective view of an embodiment of the disclosure.
Figure 3:
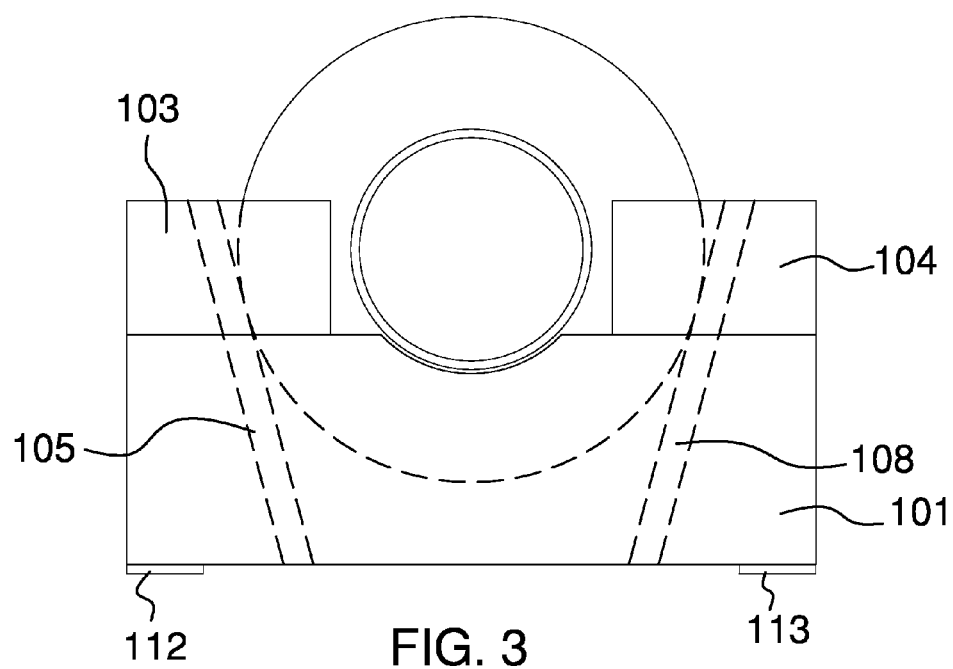
FIG. 3 is an end view of an embodiment of the disclosure.
Figure 4:
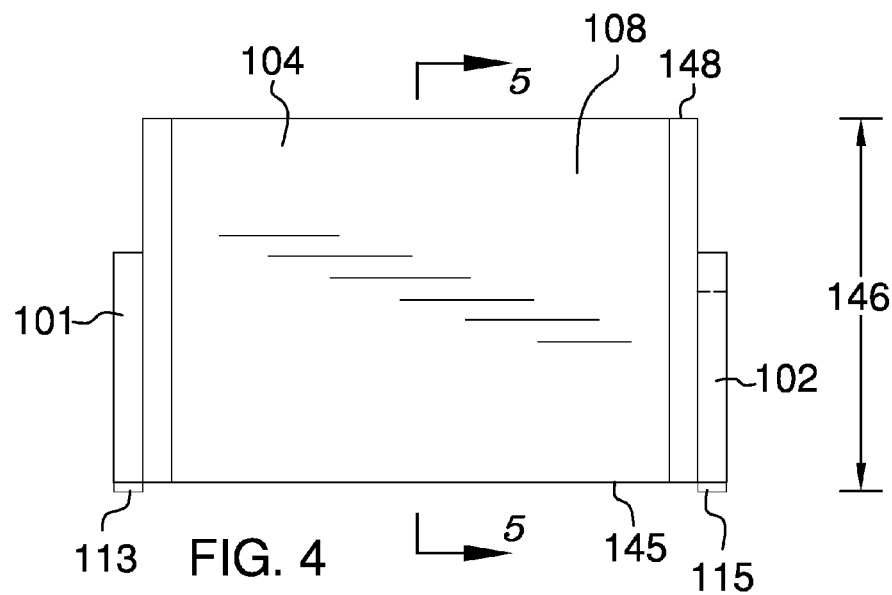
FIG. 4 is a side view of an embodiment of the disclosure.
Figure 5:
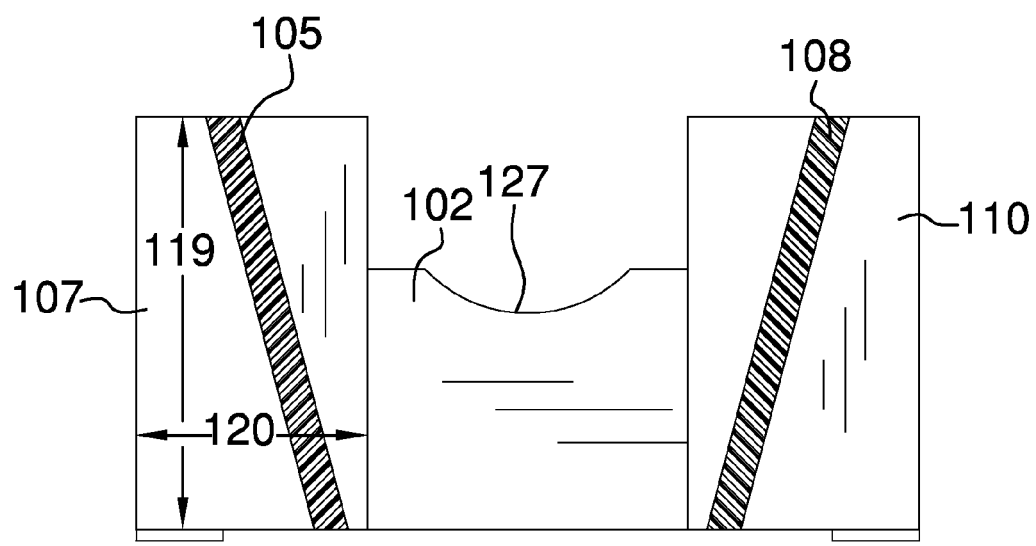
FIG. 5 is a cross-sectional view of an embodiment of the disclosure across line 5-5 in FIG. 4.

Detailed reference will now be made to a first potential embodiment of the disclosure, which is illustrated in FIGS. 1 through 5. The propane tank storage cradle 100 (hereinafter invention) comprises a first end cap 101, a second end cap 102, a third internal support 103 and a fourth internal support 104.

The third internal support 103 further comprises fifth angle brace 105, a sixth end cap 106 and a seventh end cap 107. The fifth angle brace 105 is a rectangular plank that is further defined with a sixteenth length 116, a seventeenth width 117 and an eighteenth depth 118. The sixth end cap 106 is a rectangular plank that is further defined with a nineteenth length 119, a twentieth width 120 and a twenty first depth 121. The seventh end cap 107 is a rectangular plank that is further defined with a nineteenth length 119, a twentieth width 120 and a twenty first depth 121. To assemble the third internal support 103, the sixth end cap 106 is attached to the fifth angle brace 105 such that the face of the sixth end cap 106 is attached to the twenty second edge 122 of the fifth angle brace 105 wherein the twenty second edge 122 of the fifth angle brace 105 is defined by having the seventeenth width 117 and the eighteenth depth 118 form the perimeter of the twenty second edge 122. The seventh end cap 107 is attached to the fifth angle brace 105 such that the face of the seventh end cap 107 is attached to the twenty third edge 123 of the fifth angle brace 105. The twenty third edge 123 is defined as the edge of the fifth angle brace 105 that is distal from the twenty second 122 edge of the fifth angle brace 105. The fifth angle brace 105 is attached to the sixth end cap 106 and the seventh end cap 107 so that the faces of the fifth angle brace 105 are not parallel to the nineteenth length 119 and the twentieth width 120 of either the sixth end cap 106 or the seventh end cap 107.

The fourth internal support 104 further comprises eighth angle brace 108, a ninth end cap 109 and a tenth end cap 110. The eighth angle brace 108 is a rectangular plank that is further defined with a sixteenth length 116, a seventeenth width 117 and an eighteenth depth 118. The ninth end cap 109 is a rectangular plank that is further defined with a nineteenth length 119, a twentieth width 120 and a twenty first depth 121. The tenth end cap 110 is a rectangular plank that is further defined with a nineteenth length 119, a twentieth width 120 and a twenty first depth 121. To assemble the fourth internal support 104, the ninth end cap 109 is attached to the eighth angle brace 108 such that the face of the ninth end cap 109 is attached to the twenty second edge 122 of the eighth angle brace 108 wherein the twenty second edge 122 of the eighth angle brace 108 is defined by having the seventeenth width 117 and the eighteenth depth 118 form the perimeter of the twenty second edge 122. The tenth end cap 110 is attached to the eighth angle brace 108 such that the face of the tenth end cap 110 is attached to the twenty third edge 123 of the eighth angle brace 108. The twenty third edge 123 is defined as the edge of the eighth angle brace 108 that is distal from the twenty second 122 edge of the eighth angle brace 108. The eighth angle brace 108 is attached to the ninth end cap 109 and the tenth end cap 110 so that the faces of the eighth angle brace 108 are not parallel to the nineteenth length 119 and the twentieth width 120 of either the ninth end cap 109 or the tenth end cap 110. The fourth internal support 104 is designed to be identical in construction to the third internal support 103.

The fifth angle brace 105 is identical to the eighth angle brace 108. The sixth end cap 106, seventh end cap 107, ninth end cap 109 and tenth end cap 110 are identical.

The third internal support 103 and the fourth internal support 104 are held in position using the first end cap 101 and the second end cap 102.

The first end cap 101 is a rectangular plank that is further defined with a twenty fourth length 124, a twenty fifth width 125 and a twenty sixth depth 126. The second end cap 102 is a rectangular plank that is further defined with a twenty fourth length 124, a twenty fifth width 125 and a twenty sixth depth 126. The second end cap 102 is identical to the first end cap 101. The face of the first end cap 101 is attached to the face of the sixth end cap 106 that is distal from where the sixth end cap 106 is connected to the fifth angle brace 105. The face of the first end cap 101 is attached to the face of the ninth end cap 109 that is distal from where the ninth end cap 109 is connected to the eighth angle brace 108. The face of the second end cap 102 is attached to the face of the seventh end cap 107 that is distal from where the seventh end cap 107 is connected to the fifth angle brace 105. The face of the second end cap 102 is attached to the face of the tenth end cap 110 that is distal from where the tenth end cap 110 is connected to the eighth angle brace 108. During assembly, the third internal support 103 and the fourth internal support 104 are attached to the first end cap 101 and the second end cap 102 such that the third internal support 103 and the fourth internal support 104 are positioned as mirror images to each other. The third internal support 103 and the fourth internal support 104 are further positioned such that the span between the third internal support 103 and the fourth internal support 104 increases as the height 146 from the bottom 145 of the invention 100 increases. The bottom 145 of the invention 100 is the side of the invention 100 that is placed on the floor of the automobile 147.

The second end cap 102 is further formed with a twenty seventh notch 127 in the center of the top 148 edge of the second end cap 102. The top edge 148 is the edge of the second end cap 102 that is distal from the bottom 145 edge of the second end cap 102. The twenty seventh notch 127 is formed in the arc of a circle and is sized to receive the base 142 of the propane tank 141.

A twelfth non-skid pad 112, a thirteenth non-skid pad 113, a fourteenth non-skid pad 114, and a fifteenth non-skid pad 115 are placed at the bottom 145 of the invention 100. The twelfth non-skid pad 112 and the thirteenth non-skid pad 113 are attached to the bottom 145 edge of the first end cap 101. The fourteenth non-skid pad 114 and the fifteenth non-skid pad 115 are attached to the bottom 145 edge of the second end cap 102.

To use the invention 100, the invention 100 is placed on the floor of the automobile 147 so that the twelfth non-skid pad 112, the thirteenth non-skid pad 113, the fourteenth non-skid pad 114, and the fifteenth non-skid pad 115 are in contact with the floor of the automobile 147. The cylinder 144 of the propane tank 141 is laid in the space between the third internal support 103 and the fourth internal support 104 such that the valve guard 143 of the propane tank 141 rests on the first end cap 101 and the base 142 of the propane tank 141 rests in the twenty seventh notch 127. Once the propane tank 141 is installed in the invention 100, the automobile can be driven normally.

The first end cap 101, second end cap 102, third internal support 103 and fourth internal support 104 may be formed from wood or plastic and assembled using commercially available hardware. Alternatively, the first end cap 101, second end cap 102, third internal support 103 and fourth internal support 104 may be molded as a single unit from plastic. Suitable plastics include, but are not limited to, polyethylene, polypropylene, or polycarbonate. The twelfth non-skid pad 112, the thirteenth non-skid pad 113, the fourteenth non-skid pad 114, and the fifteenth non-skid pad 115 are each commercially available non-skid pads that are formed with a sticky surface that prevents the shifting of the invention 100.

The following definitions were used in this disclosure:

Automobile: As used in this disclosure, an automobile is a road vehicle that is powered by an internal combustion engine. This definition is specifically intended to include vehicles generally referred to as pickup trucks.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Edge: As used in this disclosure, the edge refers to the surface of the object wherein two edges of the surface are formed by the depth of the object.

Face: As used in this disclosure, the face refers to the surface of an object wherein the edges of the surface are formed by the length and width of the object.

Propane Tank: As used in this disclosure, a propane tank refers to a tank that is designed for use in storing propane for consumer use.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A cradle comprising:
   a first end cap, a second end cap, a third internal support and a fourth internal support;
   wherein the cradle is adapted to store a propane tank;
   wherein the cradle is adapted for use in automobiles;
   wherein the cradle is designed in the shape of a rectangular frame;
   wherein the third internal support further is further defined with comprises a fifth angle brace, a sixth end cap and a seventh end cap;
   wherein the fourth internal support further comprises an eighth angle brace, a ninth end cap and a tenth end cap.

2. The cradle according to claim 1 wherein the fifth angle brace is identical to the eighth angle brace.

3. The cradle according to claim 2 wherein the sixth end cap, seventh end cap, ninth end cap and tenth end cap are identical.

4. The cradle according to claim 3 wherein the fifth angle brace is a rectangular plank that is further defined with a sixteenth length, a seventeenth width and an eighteenth depth.

5. The cradle according to claim 4 wherein the sixth end cap is a rectangular plank that is further defined with a nineteenth length, a twentieth width and a twenty first depth.

6. The cradle according to claim 5 wherein
   the sixth end cap is attached to the fifth angle brace such that a face of the sixth end cap is attached to a twenty second edge of the fifth angle brace;
   wherein the twenty second edge of the fifth angle brace is defined by having the seventeenth width and the eighteenth depth form the perimeter of the twenty second edge.

7. The cradle according to claim 6 wherein
   the seventh end cap is attached to the fifth angle brace such that a face of the seventh end cap is attached to a twenty third edge of the fifth angle brace;
   wherein the twenty third edge is defined as the edge of the fifth angle brace that is distal from the twenty second edge of the fifth angle brace.

8. The cradle according to claim 7 wherein the fifth angle brace is attached to the sixth end cap and the seventh end cap so that faces of the fifth angle brace are not parallel to the nineteenth length and the twentieth width of either the sixth end cap or the seventh end cap.

9. The cradle according to claim 8 wherein the ninth end cap is attached to the eighth angle brace such that a face of the ninth end cap is attached to the twenty second edge of the eighth angle brace.

10. The cradle according to claim 9 wherein the tenth end cap is attached to the eighth angle brace such that a face of the tenth end cap is attached to the twenty third edge of the eighth angle brace.

11. The cradle according to claim 10 wherein the eighth angle brace is attached to the ninth end cap and the tenth end cap so that faces of the eighth angle brace are not parallel to the nineteenth length and the twentieth width of either the ninth end cap or the tenth end cap.

12. The cradle according to claim 11 wherein the third internal support and the fourth internal support are held in position using the first end cap and the second end cap.

13. The cradle according to claim 12 wherein
   the first end cap is a rectangular plank that is further defined with a twenty fourth length, a twenty fifth width and a twenty sixth depth;
   wherein the second end cap is a rectangular plank that is further defined with a twenty fourth length, a twenty fifth width and a twenty sixth depth;
   wherein the second end cap is identical to the first end cap.

14. The cradle according to claim 13 wherein
   a selected face of the first end cap is attached to a face of the sixth end cap that is distal from where the sixth end cap is connected to the fifth angle brace;
   wherein the selected a face of the first end cap is attached to a face of the ninth end cap that is distal from where the ninth end cap is connected to the eighth angle brace;
   wherein a selected face of the second end cap is attached to a face of the seventh end cap that is distal from where the seventh end cap is connected to the fifth angle brace;
   wherein the selected face of the second end cap is attached to a face of the tenth end cap that is distal from where the tenth end cap is connected to the eighth angle brace.

15. The cradle according to claim 14 wherein the third internal support and the fourth internal support are attached to the first end cap and the second end cap such that the third internal support and the fourth internal support are positioned as mirror images to each other.

16. The cradle according to claim 15 wherein the third internal support and the fourth internal support are further positioned such that the span between the third internal support and the fourth internal support increases as the height from the bottom of the cradle increases.

17. The cradle according to claim 16 wherein
   the cradle further comprises a twelfth non-skid pad, a thirteenth non-skid pad, a fourteenth non-skid pad, and a fifteenth non-skid pad;
   wherein the twelfth non-skid pad and the thirteenth non-skid pad are attached to the bottom edge of the first end cap;
   wherein the fourteenth non-skid pad and the fifteenth non-skid pad are attached to the bottom edge of the second end cap.

18. The cradle according to claim 17 wherein the second end cap is further formed with a twenty seventh notch.

* * * * *